United States Patent
Kim et al.

(10) Patent No.: US 11,851,024 B2
(45) Date of Patent: Dec. 26, 2023

(54) SEAT BELT WIRELESS COMMUNICATION SYSTEM AND METHOD

(71) Applicants: Hyundai Motor Company, Seoul (KR); Kia Corporation, Seoul (KR)

(72) Inventors: Young Rok Kim, Gyeonggi-do (KR); Chang Kyu Bok, Seoul (KR); Beom Jung Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/842,108

(22) Filed: Jun. 16, 2022

(65) Prior Publication Data

US 2023/0072915 A1 Mar. 9, 2023

(30) Foreign Application Priority Data

Sep. 6, 2021 (KR) .......................... 10-2021-0118388

(51) Int. Cl.
*B60R 22/48* (2006.01)
*B60R 21/01* (2006.01)

(52) U.S. Cl.
CPC .............. *B60R 22/48* (2013.01); *B60R 21/01* (2013.01); *B60R 2021/01265* (2013.01); *B60R 2022/4816* (2013.01)

(58) Field of Classification Search
CPC ......... B60R 22/40; B60R 22/48; B60R 21/00; B60R 21/015; B60R 16/00; B60R 16/023; B60Q 1/00; B60Q 9/00; G08B 21/00; G08B 21/02; G08B 21/0205; G08B 29/18; G08B 29/181; G01M 17/00; G06F 19/00; G06F 9/33; H04W 4/008
See application file for complete search history.

(56) References Cited

U.S. PATENT DOCUMENTS 8,988,211 B2 3/2015 Masudaya et al.
9,845,050 B1 * 12/2017 Garza ................ G08B 21/0205
(Continued)

FOREIGN PATENT DOCUMENTS

JP 2008238947 A 10/2008
JP 2015-000592 A 1/2015
(Continued)

OTHER PUBLICATIONS

NPL Search (May 15, 2023).*

*Primary Examiner* — Van T Trieu
(74) *Attorney, Agent, or Firm* — Fox Rothschild LLP

(57) ABSTRACT

Disclosed is a seat belt wireless communication system. The system includes a detection unit provided in each seat and detecting a first signal indicating whether or not a seat belt is fastened and a second indicating a battery state, a sub-control unit provided in the each seat and transmitting the first signal and the second signal through wireless communication; and a main control unit, performing the wireless communication with each of the sub-control units, causing the sub-control unit to wake up through the wireless communication, receiving the first signal and the second signal from the sub-control unit, determining whether or not a belt of the each seat is fastened and a charged state of a battery, and controlling an output through the first signal and the second signal.

14 Claims, 3 Drawing Sheets

(56) References Cited

U.S. PATENT DOCUMENTS

| | | | | |
|---|---|---|---|---|
| 2010/0078978 A1* | 4/2010 | Owens | ............... | G08B 21/22 |
| | | | | 297/250.1 |
| 2017/0186308 A1* | 6/2017 | Aplin | ............... | E05B 41/00 |
| 2020/0017068 A1* | 1/2020 | Moffa | ............... | B60N 2/002 |
| 2022/0261307 A1* | 8/2022 | Kimura | ............... | G06F 11/0793 |

FOREIGN PATENT DOCUMENTS

| | | |
|---|---|---|
| JP | 6049081 B2 | 12/2016 |
| JP | 6054783 B2 | 12/2016 |
| JP | 6358917 B2 | 7/2018 |
| JP | 2019-043451 A | 3/2019 |
| KR | 101559510 B1 | 10/2015 |
| KR | 101704265 B1 | 2/2017 |

* cited by examiner

SEAT BELT WIRELESS COMMUNICATION SYSTEM AND METHOD

CROSS REFERENCE TO RELATED APPLICATION

The present application claims priority to Korean Patent Application No. 10-2021-0118388, filed Sep. 6, 2021, the entire contents of which is incorporated herein for all purposes by this reference.

FIELD OF THE INVENTION

The present invention relates to a seat belt wireless communication system and a seat belt wireless communication method. The seat belt wireless communication system and a seat belt wireless communication method that are capable of realizing a transmission and reception system in compliance with an infrared-ray communication scheme in a seat belt reminder system. The transmission and reception system is realized as follows. A scheme for transmitting a first signal indicating whether or not a seat belt is fastened is changed to a wireless communication scheme. A sub-control unit transmits the first signal and a second signal indicating a battery-state detection signal through wireless communication. A main control unit receives the first signal and the second signal from the sub-control unit, determines whether or not a belt of each seat is fastened and a charged state of a battery, and controls an output.

BACKGROUND

A seat belt reminder (SBR) system is a system that, through warning light or sound, advises an occupant sitting on a seat to wear a seat belt if the occupant does not wear the seat belt when a vehicle is traveling at a predetermined speed or greater.

In the seat belt reminder system, a buckle and an integrated central control unit (ICU) are electrically connected with each other in a wired manner. Thus, when a seat belt is fastened to the buckle, a buckle fastening signal is transmitted to the ICU, and the ICU makes an electrical connection to a vehicle controller through communication. The occupant is notified whether or not the seat belt is fastened.

In the related art, the seat belt reminder system is configured in such a manner that a fastening and non-fastening signal indicating whether or not the seat belt is fastened is transmitted using a wired communication scheme.

The seat belt reminder system in the related art operates in a wired state. Thus, electrical wiring is limited in installation space and place, and a reception rate is subject to positions of an obstacle and a seat, thereby decreasing a reception ratio. Accordingly, it is difficult to receive the fastening and non-fastening signal and thus to determine whether or not a belt of each seat is fastened.

In addition, if the seat belt reminder system determining whether or not the seat belt is fastened operates on low battery power, the seat belt reminder system may not operate properly and thus may not perform its intended function. Furthermore, if a fastening and non-fastening signal and a battery-state detection signal cannot be received or where a vehicle stops operating, there is a need to address the problem of dealing with previous data remaining in the seat belt reminder system.

SUMMARY OF THE INVENTION

In preferred aspects, provided are a seat belt wireless communication system and a seat belt wireless communication method that includes a transmission and reception system in compliance with an infrared-ray communication scheme in a seat belt reminder system. A scheme for transmitting a first signal indicating whether or not a seat belt is fastened is changed to a wireless communication scheme. A sub-control unit transmits the first signal and a second signal indicating a battery-state detection signal through wireless communication. A main control unit receives the first and the second signal from the sub-control unit, determines whether or not a belt of each seat is fastened and a charged state of a battery, and controls an output.

In an aspect, provided is a seat belt wireless communication system including: a detection unit provided in each seat and detecting a first signal indicating whether or not a seat belt is fastened and a second signal indicating a battery state; a sub-control unit provided in the each seat and transmitting the first signal and the second signal of the detection unit through wireless communication; and a main control unit provided in a vehicle, performing the wireless communication with each of the sub-control units, waking up the sub-control unit through the wireless communication, receiving the first signal and the second signal from the sub-control unit after the sub-control unit wakes up, determining whether or not a belt of the each seat is fastened and a charged state of a battery, and controlling an output through the first signal and the second signal that are received.

In the seat belt wireless communication system, the first signal and the second signal of the detection unit may be transmitted through the wireless communication among the sub-control units.

The sub-control unit may transmit the first signal and the second signal through the wireless communication in compliance with an infrared-ray communication scheme, and the first signal and the second signal may be an infrared-ray signal.

The sub-control unit and the main control unit may perform infrared-ray communication of the first signal and the second signal through an infrared-ray sensor provided in the sub-control unit and the main control unit.

The sub-control unit and the main control unit may be arranged in a channel passage in a closed dark space provided on a vehicle floor.

The seat belt wireless communication system may further include: an external control unit performing the wireless communication with the main control unit, receiving the first signal and the second signal from the main control unit, and controls the sub-control unit or the main control unit.

In an aspect, provided is a seat belt wireless communication method. The method includes detecting a first signal indicating whether or not a seat belt is fastened and a second signal indicating a battery state; transmitting the first signal and the second signal, which are detected, through wireless communication; performing the wireless communication with each sub-control unit, waking the sub-control unit through the wireless communication, receiving the first signal and the second signal from the sub-control unit after the sub-control unit wakes up, and determining whether or not a belt of each seat is fastened and a charged state of a battery; and controlling an output through the first signal and the second signal that are received.

In the detecting of the battery state, a voltage of the battery of the sub-control unit may be measured, and in the transmitting of the battery state detection signal through the wireless communication, a low-voltage detection signal may be transmitted when the measured voltage of the battery is a low voltage, and a battery normality detection signal may be transmitted through the wireless communication in a case where the measured voltage of the battery is not the low voltage.

In the transmitting of the first signal and the second signal through the wireless communication, the transmission may be performed through the wireless communication among the sub-control units.

In the transmitting of the first signal and the second signal through the wireless communication, the sub-control unit may transmit the first signal and the second signal through the wireless communication in compliance with an infrared-ray communication scheme, and the first signal and the second signal may be an infrared-ray signal.

The seat belt wireless communication method may further include supplying electric power to a main control unit and waking up the main control unit when a vehicle starts to operate, the supplying of the electric power being performed subsequently to the transmitting of the first signal and the second signal through the wireless communication.

The determining of whether or not the belt of the each seat is fastened and the charged state of the battery may further include performing reset control of a seat belt wireless communication system when a main control unit does not cause the sub-control unit to wake up or does not receive the first signal and the second signal from the sub-control unit after the sub-control unit wakes up.

The seat belt wireless communication method may further include performing the wireless communication with a main control unit, receiving the first signal and the second signal from the main control unit, and controlling the sub-control unit or the main control unit, the performing of the wireless communication with the main control unit being performed subsequently to the controlling of the output through the first signal and the second signal.

The seat belt wireless communication method may further include performing, by each of the sub-control unit and a main control unit, reset control of data on the first signal, data on the second signal, data on whether or not the belt of the each seat is fastened, and data on the charged state of the battery when a vehicle stops operating, the performing by each of the sub-control unit and the main control unit of the reset control being performed subsequently to the controlling of the output through the first signal and the second signal.

According to various exemplary seat belt wireless communication system and seat belt wireless communication method, the transmission and reception system in compliance with the infrared-ray communication scheme can be realized in the seat belt reminder system as follows. The scheme for transmitting the first signal indicating whether or not the seat belt is fastened is changed to the wireless communication scheme. The sub-control unit transmits the first signal and the second signal indicating the battery-state through the wireless communication. The main control unit receives the first signal and the second signal from the sub-control unit, determines whether or not the belt of the each seat is fastened and the charged state of the battery, and controls the output.

Other aspects of the invention are disclosed infra.

DETAILED DESCRIPTION

Embodiments of the present invention will be described in terms of specific structures and functions to provide an enabling disclosure of the present invention. The embodiments of the present invention may be practiced in various ways, and the present invention should not be construed as being limited thereto. The embodiments of the present invention will be described in detail below with reference to the accompanying drawings.

Figure 1:
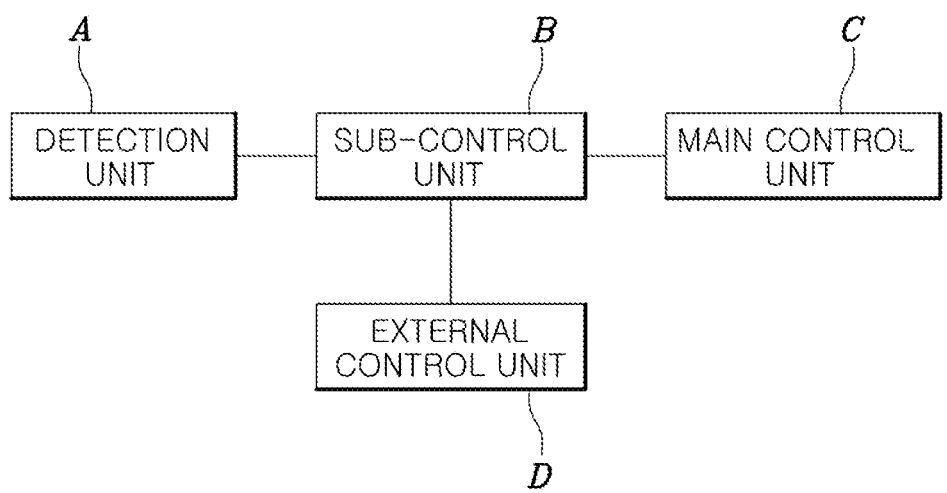
FIG. 1 shows an exemplary configuration of a seat belt wireless communication system according to an exemplary embodiment of the present invention.
Figure 2:
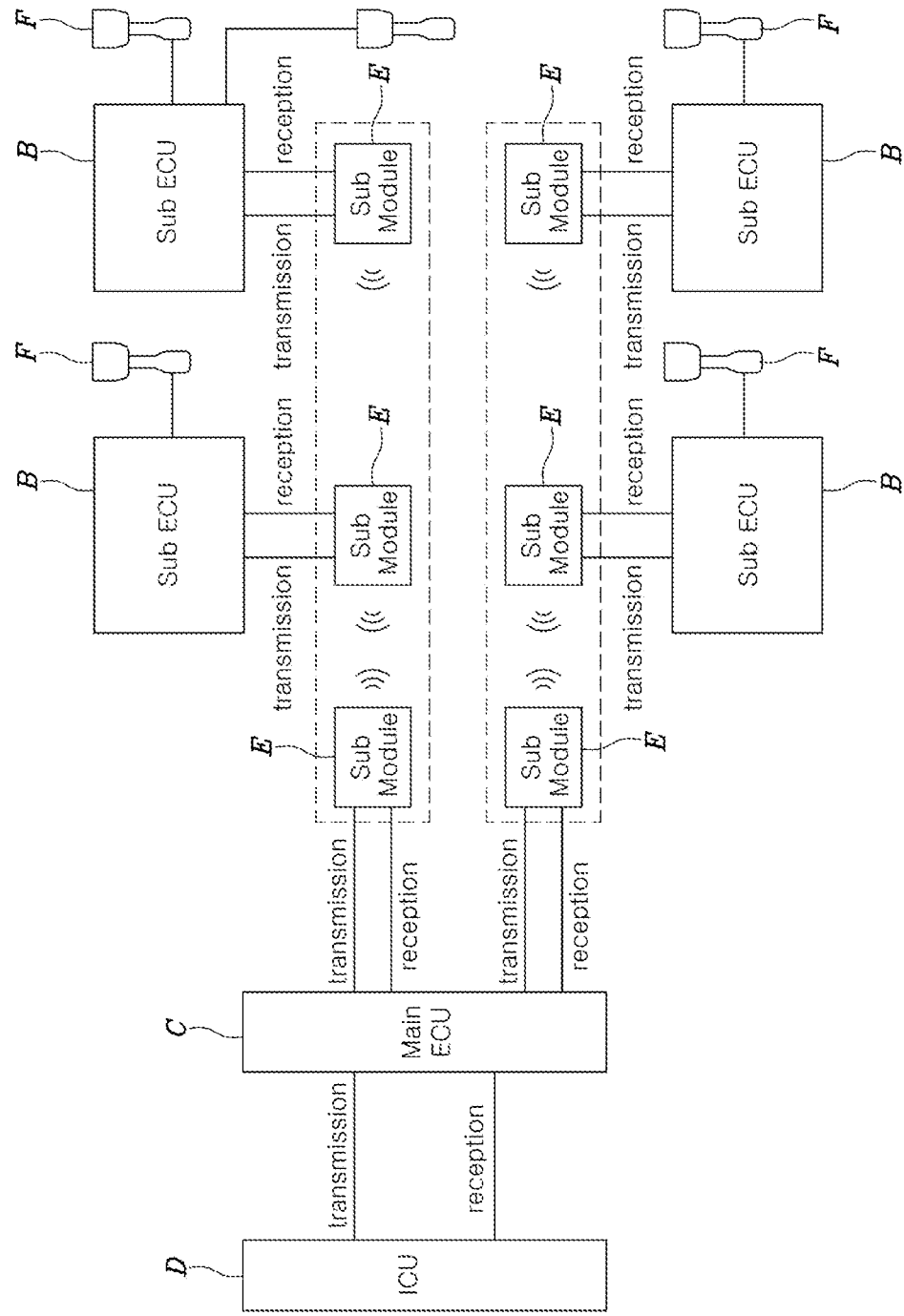
FIG. 2 shows an exemplary seat belt wireless communication system according to the present invention.
Figure 3:
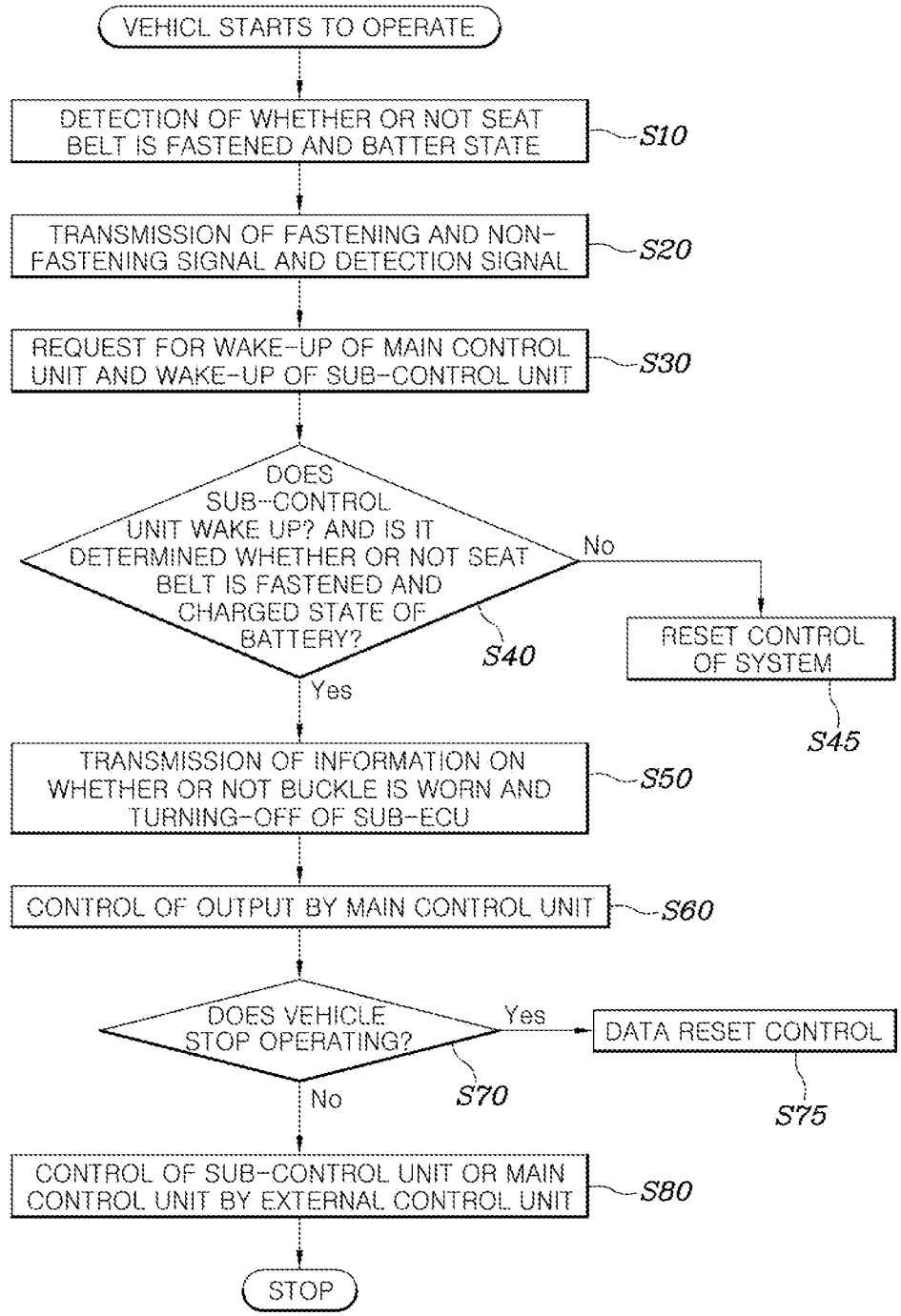
FIG. 3 shows an exemplary method for operating the seat belt wireless communication system in FIG. 1.

FIG. 1 shows an exemplary illustrating a configuration of a seat belt wireless communication system according to an exemplary embodiment of the present invention. FIG. 2 shows an exemplary seat belt wireless communication system according to an exemplary embodiment of the present invention. FIG. 3 shows an exemplary method for operating the seat belt wireless communication system in FIG. 1.

FIG. 1 is the block diagram illustrating the configuration of the seat belt wireless communication system according to an exemplary embodiment of the present invention.

As shown in FIG. 1, the seat belt wireless communication system is configured to include a detection unit A, a sub-control unit B, and a main control unit C. The detection unit A is provided in each seat and detects a first signal indicating whether or not a seat belt is fastened and a second indicating a battery state. The sub-control unit B is provided in the each seat and transmits the first signal detected in detection unit A and the second signal of the detection unit A through wireless communication. The main control unit C is provided in a vehicle. The main control unit C performs wireless communication with each sub-control unit B and wakes up the sub-control unit B through the wireless communication. The main control unit C receives the first signal and the second signal from the sub-control unit B after the sub-control unit B wakes up. The main control unit C determines whether or not a belt of the each seat is fastened and a charged state of a battery. The main control unit C controls an output through the fastening and non-fastening signal and battery-state detection signal that are received.

In a seat belt reminder system according to the present invention, a scheme for transmitting the first signal is changed to a wireless communication scheme. The sub-control unit B transmits the first signal and the second signal through the wireless communication. The main control unit C receives the first signal and the second signal from the sub-control unit B. To this end, there is a need to receive the first signal and the second signal, to determine whether or not the belt of the each belt is fastened and the charged state of the battery, and to control the output through the fastening and non-fastening signal and battery-state detection signal that are received.

Of vehicle safety devices, the seat belt is known to be the most important and effective device in terms of vehicle safety. In Korea, a seat-belt wearing ratio, particularly, a seat-belt wearing ratio of an occupant sitting on a rear seat is low when a vehicle is traveling. The recent survey shows that the seat-belt wearing ratio of the occupant sitting on the rear seat is approximately 20%. The seat belt reminder (SBR) system alerting a driver that the occupant does not wear the seat belt when the vehicle is traveling is a system that, through warning light or warning sound, advises an occupant sitting on a seat to wear the seat belt in a case where the occupant does not wear the seat belt when the vehicle is traveling at a predetermined speed or higher. In the seat belt reminder system, a buckle and an integrated central control unit (ICU) are electrically connected to each other in a wired manner. Thus, when the seat belt is fastened to the buckle, a buckle fastening signal is transmitted to the ICU, and the ICU makes an electric connection to a vehicle controller through communication. The occupant is notified whether or not the seat belt is fastened. In the related art, the seat belt reminder system is configured in such a manner that the fastening and non-fastening signal indicating whether or not the seat belt is fastened is transmitted using a wired communication scheme. The seat belt reminder system operates in a wired state. Thus, electrical wiring is limited in installation space and place, and a reception rate is subject to positions of an obstacle and a seat, thereby decreasing a reception ratio. Accordingly, it is difficult to receive the fastening and non-fastening signal and to determine whether or not the belt of the each seat is fastened. In a case where the seat belt reminder system determining whether or not the seat belt is fastened operates on low battery power, the seat belt reminder system may not operate properly and thus may not perform its intended function. Furthermore, in a case where the fastening and non-fastening signal and the battery-state detection signal cannot be received or where the vehicle stops operating, there is a need to address the problem of dealing with previous data remaining in the seat belt reminder system.

Unlike the conventional seat belt reminding system in the related art including wired communication scheme, the seat belt reminding system according to exemplary embodiments of the present invention employs the wireless communication scheme as the scheme for transmitting the fastening and non-fastening signal indicating whether or not the seat belt is fastened. A transmission and reception system in compliance with an infrared-ray communication scheme is realized. Accordingly, the sub-control unit B transmits the first signal and the second signal through the wireless communication. The main control unit C receives the fastening and non-fastening signal and the battery-state detection signal from the sub-control unit B, determines whether or not the belt of the each seat is fastened and the charged state of the battery, and controls an output.

When the vehicle is traveling, transmits through the use of the wireless communication scheme the first signal, the reception rate of the fastening and non-fastening signal indicating whether or not the seat belt is fastened is decreased because the fastening and non-fastening signal is blocked by an obstacle or because seats are arranged a great distance apart within the vehicle. In recent years, Wi-Fi, Bluetooth, and the like have been used as typical technologies for wireless communication to exchange data between two or more devices on a radio wave. Unlike in wired communication, the wireless communication scheme is usually used that allows infrared-ray technology, ultra wideband technology, and the like. For optical wireless communication, visible light may be used. However, in most cases, infrared light is used as a transmission medium. An advantage with infrared-ray wireless communication that uses an infrared ray is that infrared light having a longer wavelength than visible light passes through particulates floating in the air. When a distance is short between two devices, a bandwidth greater than that of a radio wave may be easily obtained and thus to transmit data at a high speed. Due to this advantage, in most cases, devices based on optical wireless communication in recent years employ an infrared-ray communication scheme. A major disadvantage with the infrared-ray wireless communication is that for communication, a distance between two devices has to be short and that the two devices have to face each other. The infrared-ray wireless communication is possible at a predetermined angle between the two devices and within a short distance therebetween. However, this disadvantage rather increases communication security.

The transmission and reception system in compliance with the infrared-ray communication scheme is realized. Accordingly, the sub-control unit B may wake up through the wireless communication scheme that uses an infrared ray. After the sub-control unit B wakes up, the first signal and the second signal are received from the sub-control unit B. Whether or not the belt of the each seat is fastened and the charged state of the battery are determined. The output is controlled through the fastening and non-fastening signal and battery-state detection signal that are received.

Particularly, the detection unit A may be provided in each seat and may detect the first signal indicating whether or not the seat belt is fastened and the second signal indicating the battery state. The detection unit A is provided in each of all the seats within the vehicle and detects whether or not the seat belt is fastened. The fastening of the seat belt may be fastening of a seat buckle F to a safety belt. The detection unit A may be arranged in a fastening portion of the seat belt and detect whether or not the driver fastens the seat belt. In addition, the battery state means a voltage state of a coin battery positioned in the sub-control unit B. With the voltage state of the coin battery, a battery state of the seat belt wireless communication system may be detected. Therefore, the detection unit A detects both the first signal and the second state.

In addition, the sub-control unit B may be provided in each seat and transmits the first signal of the detection unit A that indicates whether or not the seat belt is fastened and the second signal indicating the battery-state detection signal of the detection unit A through the wireless communication. The sub-control unit B may be arranged in each seat. The first signal and the second signal, which are received from the detection unit A, may be transmitted through the wireless communication between the sub-control units B or between the sub-control unit B and the main control unit C. The first signal and the second signal may be transmitted through the wireless communication by a sub-module E between the sub-control unit B in each seat via and the main control unit C or among the sub-control units B.

The main control unit C may be provided in the vehicle and perform the wireless communication with each sub-control unit B. Through the wireless communication, the main control unit C wake up the sub-control unit B. After the sub-control unit B wakes up, the main control unit C may receive the first signal and the second signal from the sub-control unit B and determines whether or not the belt of the each seat is fastened and the charged state of the battery. The main control unit C controls the output through the first signal and the second signal that are received. When the main control unit C controls an output through the first signal and the second signal that are received from the sub-control unit B, an external control unit D performs the wireless communication with the main control unit C, receives the first signal and the second signal from the main control unit C, and controls the sub-control unit B or the main control unit C. The external control unit D is also referred to as an integrated central control unit (ICU). The ICU is one of control units that serve to make a connection among control units and are responsible for vehicle safety. The ICU serves to receive a request from one other control unit through a logic signal or a CAN signal and to supply an output for performing a necessary function through the control logic of the ICU.

The main control unit C serves not only to output the first signal indicating whether or not the seat belt is fastened and the second signal indicating the battery state to the ICU, but also to operate the sub-module E. The sub-control unit B operates on the coin battery and receives a fastened state of the seat belt. With the voltage state of the coin battery, the sub-control unit B may check a voltage state of the wireless communication system and serve to operate the sub-module E. At this point, the sub-control unit B may perform control in such a manner that an event detection mode or a power-saving mode (sleep mode) is entered. With the first signal indicating whether or not the seat belt is fastened, the sub-control unit B may determine whether or not the event detection or the power-saving mode is entered. The sub-control unit B provided in each seat and the main control unit C detect the first signal indicating whether or not the seat belt is fastened, a wake-up signal, and the like that are a digital signal, and set a predetermined range where the signal indicating whether or not the seat belt is fastened, the wake-up signal, and the like are detected by the sub-control unit B and the main control unit C. Using a method in which usually a CPU detects a change in hardware and recognizes an input from the outside, the sub-control unit B detects the first signal indicating whether or not the seat belt is fastened and the wake-up signal. When receiving an interrupt request for detecting an event, the sub-control unit B starts to detect the first signal indicating whether or not the seat belt is fastened and the wake-up signal using the interruption method. In addition, the wake-up signal is detected using a rinsing edge detection method that is one of the interruption methods. In the rising edge detection method, a rising edge is detected when an input signal is transitioning from 0 to 1. In order to increase the lifetime of the battery, the sub-control unit B may perform control in such a manner that the power-saving mode (sleep mode) is entered. In particular, in a state where, except for an external interrupter, functions of a timer, an ADC, and a PWM are all controlled in such a manner as to be turned off, the sub-control unit B performs control in such a manner that the power-saving mode (sleep mode) is entered. Only when the sub-control unit B wakes up, the ADC reads the first value and makes a determination.

The first signal detected by the detection unit A that indicates whether or not the seat belt is fastened and the second signal indicating the battery-state detected by the detection unit A are transmitted through the wireless communication among the sub-control units B.

As many sub-control units B as the number of the seats arranged in the vehicle are provided. The main control unit C may receive the first signal and the second signal, which are transmitted by the sub-control unit B. The first signal and the second signal of the detection unit A may be transmitted and received through the wireless communication between the sub-control units B. Accordingly, in the seat belt wireless communication system in which the main control unit C and each of the sub-control units B are connected to each other, when one sub-control unit B is diagnosed as malfunctioning, instead of one sub-control unit B, other one sub-control unit B may receive the first signal and the second signal and may transmit the received signals to the main control unit C. When detecting that a normal operation voltage is equal to or greater than 16 V or equal to or less than 9 V, the seat belt wireless communication system detects an electric power fault and enters a low-voltage or high-voltage mode. However, in the low-voltage or high-voltage mode, the seat belt wireless communication system continues maintaining an output (a buckle state and a low BAT) to the ICU.

The sub-control unit B transmits the first signal and the second signal through the wireless communication in compliance with an infrared-ray communication scheme. The first signal and the second signal are an infrared-ray signal.

The infrared-ray communication scheme uses light as a medium. An infrared ray has a longer wavelength than visible light. Because of this, when a distance is short between two devices, a broader bandwidth can be secured than a radio wave, and thus data can be transmitted at a high speed. Therefore, the infrared-ray communication scheme that uses an infrared ray is suitable for short-distance communication. A distance between vehicle seats is so short that the infrared-ray communication scheme is suitable for communication between the vehicle seats. Thus, data can be transmitted at a high speed. Therefore, the sub-control unit B may transmit the first signal and the second signal through the wireless communication in compliance with the infrared-ray communication scheme. The first signal and the second signal are transmitted, as an infrared-ray signal carrying data, at a high speed using a broader bandwidth. In addition, the fastening and non-fastening signal indicating whether or not the seat belt is fastened may be transmitted through the wireless communication by the sub-module E between the sub-control unit B provided in each seat and the main control unit C or among the sub-control units B.

The sub-control unit B and the main control unit C perform infrared-ray communication of the first signal and the second signal through an infrared-ray sensor provided in the sub-control unit B and the main control unit C.

The infrared-ray sensor for the infrared-ray communication that is provided to the sub-control unit B and the main control unit C is configured to include a light emitting unit and a light receiving unit. The light emitting unit and the light receiving unit are generally referred to as an IRED and a photo diode, respectively. When a voltage is applied to the IRED that is the light emitting unit, an infrared ray is emitted. When infrared light is detected in the photo diode that is the light receiving unit, the infrared light is converted from optical energy to electric energy through the photoelectric effect, and thus electric current flows. The photo diode detects this electric current as a signal transmitted by the IRED that is the light emitting unit. For example, the IRED and the photo diode that constitute the infrared-ray sensor are provided to the sub-control unit B and the main control unit C. Communication of the first signal and the second signal, which are an infrared-ray signal, may be performed through the IRED and the photo diode that constitute the infrared-ray sensor configured as a separate module. The first signal indicating whether or not the seat belt is fastened may be transmitted through the wireless communication by the sub-module E between the sub-control unit B provided in each seat and the main control unit C, or the first signal indicating whether or not the seat belt is fastened and the second signal indicating the battery-state detection signal may be transmitted through the wireless communication by the sub-module E among the sub-control units B.

The sub-control unit B and the main control unit C may be arranged on a vehicle floor. A closed dark space having a channel passage may be provided in the vehicle floor. The sub-control unit B and the main control unit C may be arranged in the channel passage.

In the infrared-ray communication scheme that uses an infrared ray, when an obstacle is present between the vehicle seats, a reception rate of the infrared-ray signal is remarkably decreased. After the sub-control unit B wakes up, when the first signal and the second signal are not received from the sub-control unit B, the main control unit C receives the first signal and the second signal from the sub-control unit B, and determines whether or not the belt of the each seat is fastened and the battery state. After the sub-control unit B wakes up, when the first signal and the second signal are not received from the sub-control unit B, it cannot be determined that the sub-control unit B, from which the signals are not received, malfunctions, and thus a seat belt reminder function cannot be completely performed. An infrared-ray observation device or an infrared-ray sensor, when its temperature is low, can well detect an infrared ray. Therefore, it is very important to cool such a device. Therefore, a decrease in the reception rates of the first signal and the second signal that are received from the sub-control unit B can be prevented by arranging the sub-control unit B and the main control unit C in the channel passage in the closed dark space.

FIG. 2 shows an exemplary seat belt wireless communication system according an exemplary embodiment of the present invention.

For example, the external control unit D may be further included. The external control unit D performs wireless communication with the main control unit C, receives the first signal and the second signal from the main control unit C, and controls the sub-control unit B or the main control unit C.

The external control unit D is also referred to as an integrated central control unit (ICU). The ICU is one of control units that serve to make a connection among control units and are responsible for vehicle safety. The ICU serves to receive a request from one other control unit through a logic signal or a CAN signal and to supply an output for performing a necessary function through the control logic of the ICU. Therefore, the external control unit D may directly perform wireless communication with the main control unit C. Thus, the external control unit D may receive the fastening and non-fastening signal and the battery-state detection signal from the main control unit C and may wirelessly control the sub-control unit B or the main control unit C through the fastening and non-fastening signal and the battery-state detection signal that are received.

FIG. 3 shows an exemplary method for operating the seat belt wireless communication system in FIG. 1.

For example, a seat belt wireless communication method includes: Step S10 of detecting a first signal indicating whether or not a seat belt is fastened and a second signal indicating a battery state; Step S20 of transmitting the first signal and the second signal that are detected, through wireless communication; Step S40 of performing wireless communication with each sub-control unit B, causing the sub-control unit B to wake up through the wireless communication, receiving the first signal and the second signal from the sub-control unit B after the sub-control unit B wakes up, and determining whether or not a belt of the each seat is fastened and a charged state of a battery; and Step S60 of controlling an output through the fastening and non-fastening signal and the battery-state detection signal that are received.

A technical feature associated with each step of the seat belt wireless communication method according to an exemplary embodiment of the present invention is the same as or similar to a technical feature of the corresponding constituent element of the seat belt wireless communication system according to the present invention that is described above, and a detailed description thereof is omitted.

In Step S10 of detecting the battery state, a voltage of a battery of the sub-control unit B. In Step S20 of transmitting the second signal indicating battery-state detection signal through wireless communication, when the measured voltage of the battery is a low voltage, a battery low-voltage detection signal is transmitted. Furthermore, when the measured voltage of the battery is not a low voltage, a battery normality detection signal is transmitted through the wireless communication.

In Step S20 of transmitting the fastening and non-fastening signal and the battery-state detection signal through the wireless communication, the transmission is performed through the wireless communication between the sub-control units B.

In Step S20 of transmitting the first signal and the second signal through the wireless communication, the sub-control unit B transmits the first signal and the second signal through the wireless communication in compliance with an infrared-ray communication scheme, and the first signal and the second signal are an infrared-ray signal.

The seat belt wireless communication method may further include Step S30 of supplying electric power to a main control unit C and causing the main control unit C to wake up in a case where a vehicle starts to operate. Step S30 is performed subsequently to Step S20 of transmitting the first signal and the second signal through the wireless communication.

Step S40 of determining whether each of the seat belts is fastened and the charged state of the battery may further include Step S45 of performing reset control of a seat belt wireless communication system in a case where the main control unit C is not able to wake up a sub-control unit B or is not able to receive the first signal and the second signal from the sub-control unit B after the sub-control unit B wakes up. The seat belt wireless communication system is rebooted after the reset control is performed. The reset control is performed to prevent a failure warning from frequently occurring and to increase the reliability of the seat belt wireless communication system.

In Step S40 of performing the wireless communication with each sub-control unit B, waking up the sub-control unit B to wake up through the wireless communication, receiving the first signal and the second signal from the sub-control unit B after the sub-control unit B wakes up, and determining whether or not the belt of the each seat is fastened and the charged state of the battery, the sub-control unit B may wake up when the main control unit C wakes up and by recognizing an external interruption according to a wake-up signal of the main control unit C, or may wake up by recognizing the external interruption according to the first signal and the second signal that are detected by the detection unit A. In addition, when switching from a normal state to the sleep state takes place, there is no data stored in an Electrically Erasable Programmable Read-Only Memory (EEPROM) of the sub-control unit B. Furthermore, when switching from the sleep state to the normal state takes place, there is also no data stored in the EEPROM of the sub-control unit B.

The seat belt wireless communication method may further include Step S80 of performing the wireless communication with the main control unit C, receiving the first signal and the second signal from the main control unit C, and controlling the sub-control unit B or the main control unit C. Step S80 is performed subsequently to Step S60 of controlling the output through the first signal and the second signal.

The seat belt wireless communication method may further include Step S70 of determining whether or not a vehicle stops operating. Step S70 is performed subsequently to Step S60 of controlling the output through the first signal and the second signal, but prior to Step S80 of performing the wireless communication with the main control unit C, receiving the first signal and the second signal from the main control unit C, and controlling the sub-control unit B or the main control unit C.

The seat belt wireless communication method may further include Step S75 of performing, by each of the sub-control unit B and the main control unit C, reset control of data on the first signal and the second signal, data on whether or not the belt of the each seat is fastened, and data on the charged state of the battery when the vehicle stops operating. Step S75 is performed subsequently to Step S60 of controlling the output through the first signal and the second signal.

The exemplary embodiments of the present invention are described above with reference to the accompanying drawings. It would be obvious to a person of ordinary skill in the art that various modifications and alterations are possibly made to the present invention without departing from the technical idea of the present invention that is claimed in the following claims.

DESCRIPTION OF REFERENCE NUMERALS

A: detection unit
B: sub-control unit
C: main control unit
D: external control unit
E: sub-module
F: seat buckle

What is claimed is:

1. A seat belt wireless communication system comprising:
a detection unit provided in each seat and detecting a first signal that indicates whether or not a seat belt is fastened and a second signal indicating a battery state;
a sub-control unit provided in the each seat and transmitting the first signal and the second signal of the detection unit through wireless communication; and
a main control unit provided in a vehicle, performing the wireless communication with each of the sub-control units, waking up the sub-control unit through the wireless communication, receiving the first signal and the second signal from the sub-control unit after the sub-control unit wakes up, determining whether or not a belt of the each seat is fastened and a charged state of a battery, and controlling an output through the first signal and the second signal.

2. The seat belt wireless communication system of claim 1, wherein the first signal and the second signal of the detection unit are transmitted through the wireless communication among the sub-control units.

3. The seat belt wireless communication system of claim 1, wherein the sub-control unit transmits the first signal and the second signal through the wireless communication in compliance with an infrared-ray communication scheme, and the first signal and the second signal are an infrared-ray signal.

4. The seat belt wireless communication system of claim 1, wherein the sub-control unit and the main control unit perform infrared-ray communication of the first signal and the second signal through an infrared-ray sensor provided in the sub-control unit and the main control unit.

5. The seat belt wireless communication system of claim 1, wherein the sub-control unit and the main control unit are arranged in a channel passage in a closed dark space provided in a vehicle floor.

6. The seat belt wireless communication system of claim 1, further comprising:
an external control unit performing the wireless communication with the main control unit, receiving the first signal and the second signal from the main control unit, and controls the sub-control unit or the main control unit.

7. A seat belt wireless communication method comprising:
detecting a first signal that indicates whether or not a seat belt is fastened and a second signal indicating a battery state;
transmitting the first signal and the second signal, which are detected, through wireless communication;
performing the wireless communication with each sub-control unit, waking up the sub-control unit through the wireless communication, receiving the first signal and the second signal from the sub-control unit after the sub-control unit wakes up, and determining whether or not a belt of each seat is fastened and a charged state of a battery; and
controlling an output through the first signal and the second signal that are received.

8. The seat belt wireless communication method of claim 7, wherein in the detecting the second signal, a voltage of the battery of the sub-control unit is measured, and
wherein, in the transmitting of the second signal through the wireless communication, a low-voltage detection signal is transmitted in a case where the measured voltage of the battery is a low voltage, and a battery normality detection signal is transmitted through the wireless communication in a case where the measured voltage of the battery is not the low voltage.

9. The seat belt wireless communication method of claim 7, wherein in the transmitting of the first signal and the second signal through the wireless communication, the transmission is performed through the wireless communication among the sub-control units.

10. The seat belt wireless communication method of claim 7, wherein in the transmitting of the first signal and the second signal through the wireless communication, the sub-control unit transmits the first signal and the second signal through the wireless communication in compliance with an infrared-ray communication scheme, and the first signal and the second signal are an infrared-ray signal.

11. The seat belt wireless communication method of claim 7, further comprising:
supplying electric power to a main control unit and waking up the main control unit when a vehicle starts to operate, the supplying of the electric power being performed subsequently to the transmitting of the fastening and non-fastening signal and the battery-state detection signal through the wireless communication.

12. The seat belt wireless communication method of claim 7, wherein the determining of whether or not the belt of the each seat is fastened and the charged state of the battery further comprises:
performing reset control of a seat belt wireless communication system when a main control unit does not wake up the sub-control unit or does not receive the fastening and non-fastening signal and the battery-state detection signal from the sub-control unit after the sub-control unit wakes up.

13. The seat belt wireless communication method of claim 7, further comprising:
performing the wireless communication with a main control unit, receiving the first signal and the second signal from the main control unit, and controlling the sub-control unit or the main control unit, the performing of the wireless communication with the main control unit being performed subsequently to the controlling of the output through the first signal and the second signal.

14. The seat belt wireless communication method of claim 7, further comprising:

performing, by each of the sub-control unit and a main control unit C, reset control of data on the first signal, data on the second signal, data on whether or not the belt of the each seat is fastened, and data on the charged state of the battery when a vehicle stops operating, the performing by each of the sub-control unit and the main control unit of the reset control being performed subsequently to the controlling of the output through the first signal and the second signal.

* * * * *